United States Patent [19]

De Bradandere et al.

[11] 4,399,593
[45] Aug. 23, 1983

[54] HOSE CLAMP WITH WEDGED LOCK

[76] Inventors: Joan De Bradandere, 245 rue de Roubaix, 7700 Mouscron; Freddy VanMeenen, 91 rue des Deportes, 7701 Mouscron, both of Belgium

[21] Appl. No.: 286,171

[22] Filed: Jul. 23, 1981

[30] Foreign Application Priority Data

May 5, 1981 [FR] France .............................. 81 09282

[51] Int. Cl.³ .................... B65D 63/08; F16L 33/00
[52] U.S. Cl. ........................................ 24/25; 24/20 R; 292/256.63
[58] Field of Search ............... 24/25, 20 R, 20 TT, 24/255 SL, 268, 20 S, 23 R; 100/212; 292/323, 322, 256.63

[56] References Cited

U.S. PATENT DOCUMENTS

| | | | |
|---|---|---|---|
| 113,406 | 4/1871 | Densmore | 24/25 |
| 130,032 | 7/1872 | Fautz | 24/25 |
| 199,788 | 1/1878 | Chapman | 24/25 |
| 296,686 | 4/1884 | Gresham | 24/25 |
| 1,561,869 | 11/1925 | Lins | 292/323 |
| 3,300,825 | 1/1967 | Andreasen | 24/25 |
| 3,900,922 | 8/1975 | McCormick | 24/16 PB |
| 4,053,965 | 10/1977 | Marchou | 24/20 TT |
| 4,128,919 | 12/1978 | Bulanda et al. | 24/20 TT |
| 4,319,385 | 3/1982 | Marchou | 24/20 R |

FOREIGN PATENT DOCUMENTS

| | | | |
|---|---|---|---|
| 89366 | 6/1957 | Norway | 24/25 |
| 826295 | 12/1959 | United Kingdom | 24/20 TT |

*Primary Examiner*—John J. Wilson
*Attorney, Agent, or Firm*—Robert E. Burns; Emmanuel J. Lobato; Bruce L. Adams

[57] ABSTRACT

The invention relates to a non-reusable hose-clip, intended to ensure for example the connection of two tubular members. The invention also relates to a tool for tightening the clip.

The clip is composed of a band forming a loop comprising a free end (2).

It is characterized by the fact that in the vicinity of the other end it comprises locking means (4) which are self-tightening due to wedging of the free end. These means are preferably constituted by a casing (8) of convergent shape and a wedge (17) of complementary shape. Possibly, spring means (24) restore the wedge to the locked position. Also, wedging may be reinforced by the engagement of complementary teeth.

Also, in the vicinity of the terminal part of its free end (2), the clip according to the present invention comprises means facilitating calibrated tightening of the latter. According to one embodiment, these means comprise an aperture (7), possibly a flange (6) by which the swinging head of a pulling tool engages the band. According to another embodiment, these means comprise a calibrated deformation in the free end (2) which a pulling tool "rolls".

11 Claims, 11 Drawing Figures ously given solely by way of example
HOSE CLAMP WITH WEDGED LOCK

FIELD OF THE INVENTION

The invention relates to a hose-clip as well as to a tool intended to bring about tightening of the clip.

In particular, the invention relates to a hose-clip intended to ensure the connection of two tubular members. Clips of this type have numerous applications, for example in a motor vehicle, in particular for joining flexible hoses.

BACKGROUND OF THE INVENTION

Hose-clips are generally constituted by a metal band, forming a loop, comprising a free end and means for tightening this free end in the vicinity of the other end.

The tightening means are generally constituted by a worm in which mesh slightly inclined notches provided in the thickness of the free end. The rotation of the worm causes the forwards movement of the notches and the meshing of new notches, thus bringing about tightening or loosening of the clip, according to the direction of rotation.

Clips of this type have a major drawback. This drawback emanates from the fact that tightening of the clip and thus the firmness of the connection which it produces introduces human factors which it is difficult to control. In fact it is left to the operator to determine correct positioning of the clip and the intensity of its tightening.

With current clips, it is difficult to control the intensity of the tightening, also on account of the reduction existing between the rotation of the worm and the forwards movement of the free end of the clip and of the friction in this region.

Another drawback of existing clips is that they can be dismantled then refitted, for example when repairing a motor vehicle. Their reliability and firmness are reduced substantially after these repeated dismantling and refitting operations.

SUMMARY OF THE INVENTION

One of the objectives of the present invention is to propose a hose-clip which remedies these drawbacks and which is virtually completely secure after fitting.

Another objective of the present invention is to propose a clip which can be tightened to a predetermined tension, for example by the motor vehicle manufacturer and in a repetitive manner from one clip to another.

Another objective of the present invention is to propose a hose-clip which cannot be re-used after it has once been fitted.

Another objective of the present invention is to propose a tool making it possible to tighten the clip to a predetermined tension.

Other objectives and advantages of the present invention will become apparent from the ensuing description, which is nevertheless given solely by way of example and is not intended to limit the latter.

The hose-clip intended to ensure the connection of two tubular members, which cannot be re-used, is composed of a metal band forming a loop and comprising a free end, is characterised by the fact that in the vicinity of the other end it comprises locking means which are self-tightening due to wedging of the free end.

The tightening tool which operates by pulling on the free end of the clip is characterised by the fact that it comprises a head extended by a lug, arranged substantially at right angles to the pulling direction, swinging into an orientation approximately parallel to the pulling direction beyond a predetermined exerted pulling force.

BRIEF DESCRIPTION OF THE DRAWINGS

The invention will be better understood on referring to the ensuing description and to the accompanying drawings which form an integral part thereof.

DESCRIPTION OF PREFERRED EMBODIMENTS

Figure 1:
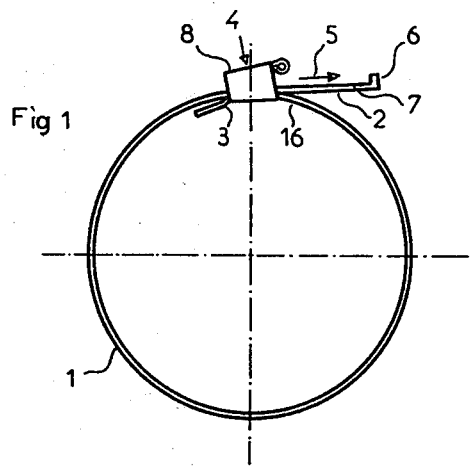
FIG. 1 is a general view of the hose-clip according to the present invention.

The clip illustrated in FIG. 1 is constituted by a metal band 1 substantially forming a loop. As is known, this loop is intended to cover at least partially, for example, the connection region of two tubes fitted one in the other and to bring about the tightening of the outer tube on the inner tube.

The metal band 1 has a free end 2 which is preferably located outside the loop. Furthermore, in the vicinity of its other end 3, the metal band 1 comprises locking means 4. The free end 2 of the band 1 passes through these locking means 4.

The function of the latter is to keep the tightening of the clip, for example on tubes, at a predetermined value, the determination of which value will be described hereafter. In other words, they allow the movement of the free end 2 in the direction illustrated by arrow 5 and prevent the movement of the end 2 in the opposite direction.

On the other hand, in a preferred embodiment, in the vicinity of its free end 2, the band 1 comprises a flange 6 which may be obtained for example by bending the band. Furthermore, the end 2 comprises an orifice or aperture 7 which is recessed with respect to the flange 6. The function of the flange 6 and of the aperture 7 will be described hereafter.

According to the invention, the locking means 4 are self-tightening means operating by wedging of the free end 2 of the band on the other end 3. These means are constituted by a casing 8, defining internally an area converging in the direction of an opening movement of the loop, i.e. the opposite direction to that of arrow 5. The means also comprise a wedge, the shape of which complements that of the inner region defined by the casing 4, taking into account the thickness of the band 1 in the vicinity of its free end 2.

Furthermore, spring means restore the wedge inside the region defined by the casing 8 to a locking position, i.e. for wedging the free end 2 of the band 1.

In order to improve the relative adhesion of the various surfaces which are brought into contact by the wedging of the wedge in the casing and thus the efficiency of the wedge, at least one part of the latter may comprise means such as teeth, notches, pegs . . . .

Figure 2:
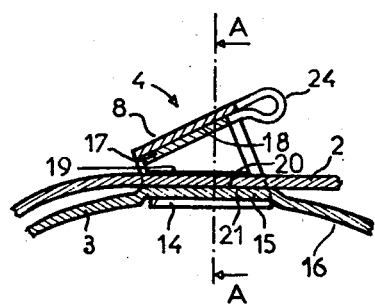
FIG. 2 shows the tightening region of the ends of the clip in section through a plane parallel to the plane of FIG. 1.
Figure 3:
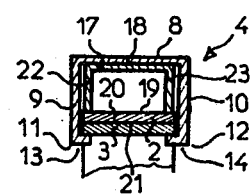
FIG. 3 is a view of the same region along section line A—A.

FIGS. 2 and 3 illustrate the casing 8 and the wedge as well as the spring means in a preferred embodiment.

In the embodiment illustrated, in cross section, in a plane parallel to that of FIG. 3, the casing 8 is in the shape of an inverted U on the end 3 of the band, whereof the length of the sides 9 and 10 decreases in the direction of the convergence of the region defined by the casing 8, i.e. in the opposite direction to that of the arrow 5. Furthermore, in the vicinity of the ends 11 and 12 of its side walls corresponding to the sides 9 and 10, the casing comprises means for attachment to the end 3 of the band.

As illustrated, these means are constituted for example by two clamps 13 and 14, obtained by bending the side walls of the casing 10 inwards, the latter bearing against a deformed region 15 of the end 3, visible in FIG. 2.

The deformation 15 is substantially in the shape of a flattened castellation, its length is substantially equal to the length of the two clamps 13 and 14 and its depth is substantially equal to the thickness of the casing in the region of the clamps 14.

Its function is primarily to connect the casing 8 to the end 3 of the band, at the time of tightening and locking of the clip and subsequently to substantially maintain the continuity of the inner periphery 16 of the latter in the vicinity of the locking means 4.

In the embodiment illustrated, the locking means also comprise a wedge 17, the external shape of which complements that of the inner region defined by the casing 8, bearing on the one hand against the upper inner surface 18 of the casing 8 and on the upper surface 19 of the free end 2, the lower surface 20 of which is in contact with the upper surface 21 of the end 3.

Preferably, like the casing 8, the wedge 17 has a cross section, in a plane parallel to the plane of FIG. 3, in the form of an inverted U on the free end 2, whereof the length of the sides 22 and 23 decreases in the direction of the convergence of the casing 8, i.e. in the opposite direction to that of the arrow 5. Naturally, the overall width of the wedge is substantially less than the inner width of the casing 8.

Thus, pulling on the free end 2 in a direction opposed to that of the arrow 5, which corresponds to the reaction of the band 1 after tightening and tensioning, causes wedging of the wedge 17 in the casing 8 and gripping of the free end 2 on the end 3 of the band 1. On the other hand, a pulling action exerted on the free end 2 in the direction of arrow 5, which corresponds to tightening of the clip, causes unwedging of the wedge 17 and thus allows the relative sliding of the free end 2 in the direction of arrow 5 with respect to the end 3 of the band.

Spring means restore the wedge to the wedging position in the casing, in order to bring about this wedging action as soon as the traction exerted on the free end 2, in the direction of arrow 5, ceases. In the embodiment illustrated, these means are constituted by a resilient loop 24 which connects the casing 8 and the wedge 17.

Figure 4:
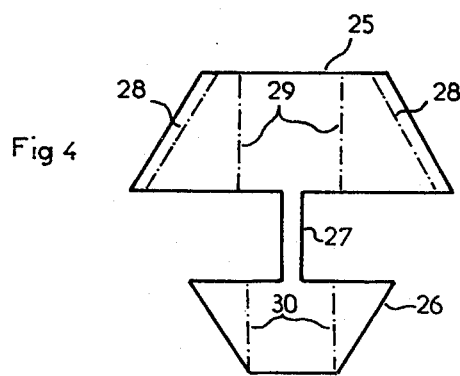
FIG. 4 shows an embodiment of part of the locking means.

Advantageously, the casing 8 and the wedge 17 as well as the return means 24 are formed by cutting and bending a metal sheet for example. FIG. 4 shows the casing 8, the wedge 17 and the return means 24 diagrammatically after cutting out and before bending.

The casing 8 and the wedge 17 are substantially in the form of two isosceles trapeziums respectively 25 and 26, facing each other by their major base. The two trapeziums are connected in the vicinity of their major base by a strip 27 which after bending constitutes the resilient return means 24.

A man skilled in the art will easily discover the nature of the most suitable material, which may be steel for example, for producing the casing 8, the wedge 17 and the return means 24.

In FIG. 4, the dot dash lines indicate the bending lines of the trapezium 25 and of the trapezium 26. The bending lines 28 correspond to the bending of the clamps 13 and 14. The bending lines 29 correspond to the shaping of the side walls and of the upper wall of the casing 8. The same is true for the lines 30 relating to the trapezium 26 and thus to the wedge 17.

In order to bring about tightening of the clip illustrated in FIG. 1, the invention proposes to exert traction on the free end 2, in the direction of arrow 5, up to a predetermined value, corresponding to a predetermined tension of the band 1 and a predetermined tightening intensity of the clip. Advantageously, the tightening action which consists of exerting traction on the free end 2 is automatically interrupted beyond a predetermined pulling force. This is achieved by means of the orifice or aperture 7 and the flange 6 of the free end 2, as well as by the tightening tool shown diagrammatically by way of illustration in FIG. 5.

Figure 5:
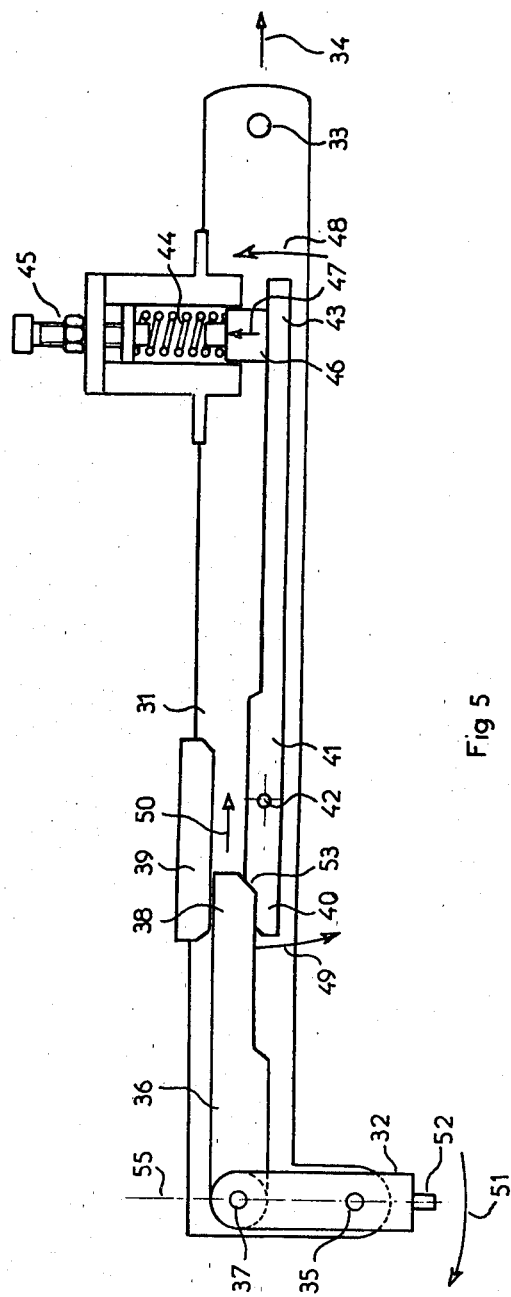
FIG. 5 shows a tightening tool diagrammatically.

The tool shown diagrammatically in FIG. 5 is constituted by an elongated member 31 comprising a swinging head 32 at one of its ends and at the other end means shown diagrammatically at 33 which make it possible to connect the tool to a member which is able to exert traction in the direction of arrow 34.

The swinging head 32 is extended by a lug 52 and with the lug it defines an axis 55 substantially perpendicular to the initial pulling direction. It is also pivoted with respect to a pivot 35, substantially perpendicular to the plane of FIG. 5. It is also pivoted with respect to a pivot 37 on a push-rod 36. The end 38 of this push-rod is retained at one side between a fixed abutment 39 and at the other side between the end 40 of a lever 41.

The lever 41 is pivoted with respect to a pivot 42, substantially parallel to the former. In the vicinity of its other end 43, a compression spring 44 presses on this end, which corresponds to locking of the end 38 of the push-rod 36 between the fixed abutment 39 and the end 40 of the lever. The spring 44 is calibrated and means shown diagrammatically at 45 make it possible to regulate the force which it exerts on the end 43 of the lever. Furthermore, a part 46 preferably ensures the connection between the spring and the end 43 of the lever.

Thus, pulling of the tool substantially in the direction of arrow 34 corresponds to pushing of the end 43 of the lever against the compression spring 44 substantially in the direction of arrow 47, which results in a rotation of the lever 41 about its pivot 42, in the direction indicated by the arrows 48 and 49. The rotation of the lever 41 is thus in a direction such that the end 40 moves away from the fixed abutment 39.

Beyond a pulling force predetermined by the calibration of the spring, the end 38 of the push-rod 36 is released and the push-rod moves substantially in the direction of arrow 50. The movement of the push-rod corresponds to swinging of the head 32 about its pivot 35 in the direction of arrow 51.

Advantageously, with the aim of improving the accuracy of the release of the tool, corresponding to the swinging of the head 32, the contact surface 53 between the push-rod 36 and the end 40 of the lever 41 is inclined.

Thus, swinging of the head 32 is mainly controlled by the compression of the spring 44. Taking into account the dimensions of the various members in particular, a man skilled in the art will easily determine the ratio between the compression of the spring 44 and the limiting pulling force beyond which the head 32 swings.

Naturally, the description of the tool is given solely by way of example and other tools could facilitate tightening of the clip according to the present invention. However, the tools able to fulfil this function advantageously comprise a head, corresponding to the head 32, which swings beyond a predetermined pulling force.

Figure 6:
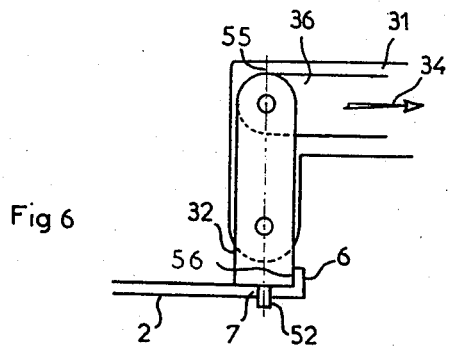
FIGS. 6 to 8 relate to different stages of the tightening of a clip with the tool of FIG. 5.
Figure 7:
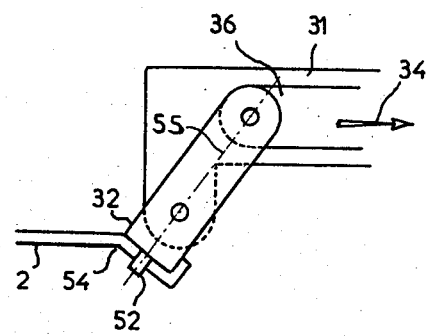
Figure 8:
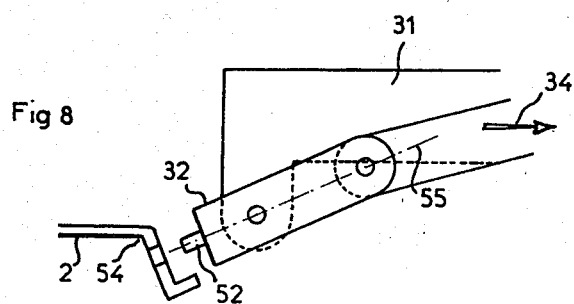

FIGS. 6 to 8 show the various stages of tightening the clip and more particularly its free end 2.

The lug 52 which extends the head 32 of the tool is engaged in the orifice or aperture 7 in the free end. The lug and orifice thus have complementary shapes. The engagement of the lug 52 in the orifice 7 advantageously corresponds to the bearing of the inner face 56 of the flange 6 against the head, as shown in FIG. 6.

Traction exerted on the body of the tool 31, in the direction of arrow 34, is substantially transmitted to the vicinity of the free end 2. This traction thus causes tightening of the clip, i.e. a movement of the free end 2 in the direction of arrow 5. In certain cases, it may reach 500 kgf.

Beyond a predetermined pulling force, the head 32 swings, as illustrated in FIGS. 7 and 8.

As shown in FIG. 7, swinging of the head corresponds to bending at 54 of the free end 2. This bending is caused by the deflection exerted by the lug 52 and the lower part of the head 32 bearing on the face 56 of the flange 6, on the free end 2.

FIG. 8 shows the head at the end of its swinging movement. The axis 55 of the head 32, which initially was substantially perpendicular to the free end 2 and to the pulling direction 34 has moved towards this direction, until it has become approximately parallel thereto. This results in the automatic extraction of the head 32.

It should be noted that then, substantially immediately and at the same time as this extraction, the wedge 17, biased by the spring means 24 wedges the free end 2 with respect to the casing 8 and thus with respect to the end 3 of the clip. Wedging is facilitated by the reaction of the clip to the traction to which its end 2 has been subjected.

Moreover, the bending 54 of the free end 2 makes it possible to check visually that tightening has been effected to the predetermined intensity. This tightening is destructive, i.e. it cannot be removed by means of the tightening tool. Thus, for example, when the clip is dismantled, it will not be possible to re-use the latter and it will be necessary to replace the said clip. This thus improves its reliability with regard to existing clips, all the more since tightening is effected substantially automatically and repetitively from one clip to another.

Figure 9:
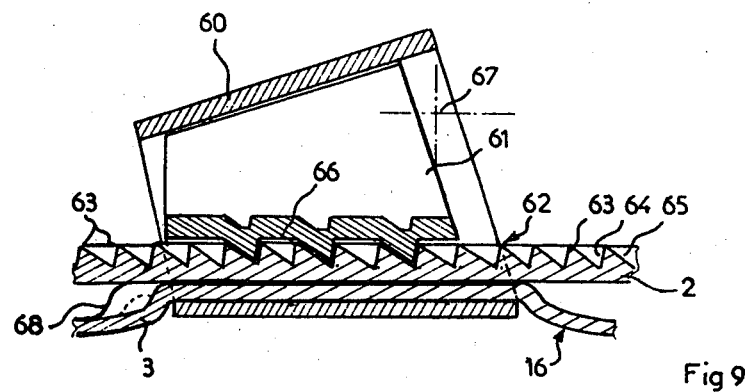
FIGS. 9 to 11 illustrate variations of the locking means and pulling means.

FIG. 9 shows a variation of the afore-described locking means. According to this variation, wedging of the wedge in the casing, which causes gripping of the free end 2 of the band on the end 3 is assisted by the engagement of two sets of complementary teeth, respectively located on the upper side of the free end 2 and on the lower side of the wedge.

FIG. 9 shows a casing 60 substantially identical to the casing 8 of the preceding figures. This casing is clipped or welded to the end 3 of the band constituting the clip as in the preceding case, preferably in the vicinity of a deformation in the form of a castellation, the purpose of which is to ensure the continuity of the inner periphery 16 of the clip.

Housed inside the casing 60 is a wedge 61, which is able to grip the end 2 of the band against its end 3.

The upper surface of the free end 2, facing the wedge, is provided with teeth or notches 62. These teeth or notches are provided over a sufficient length of the free end 2, in order that a part thereof is located in the locking region corresponding to FIG. 9, when the clip is tightened.

The teeth 63 which comprise the toothing or notches 62 preferably have a greater inclination in the vicinity of their face 64 situated in the direction corresponding to loosening of the clip, than in the vicinity of their face 65 situated in the direction corresponding to tightening of the clip.

The wedge 61 substantially has a U shaped section, the width of which is slightly less than the width of the casing 60 and corresponds substantially to the width of the free end 2.

The wedge 61 is provided below its lower face 66 with toothing or notches complementing the toothing or notches 62 and directed towards the free end 2. The inclination of the face of the teeth of the wedge 61 has an opposed orientation to that of the teeth 63.

The toothing of the wedge comprises at least one tooth and preferably two teeth or more. The teeth of the wedge 61 can have a spacing substantially equal to the spacing of the teeth 63, whereas, as illustrated in FIG. 9, the spacing of the teeth of the wedge 61 is twice that of the teeth 63.

As illustrated in FIG. 9, the wedge 61 has a U-shaped cross section, whereof the length of the sides decreases in a manner corresponding to the decrease of the sides of the section of the casing 60. The toothing or notches which it comprises are at least situated in the central region of its lower face. In a parallel arrangement, the free end 2 comprises the toothing or notches 62 at least along its width in its central region.

The opposite arrangement is also possible, according to which, as in the preceding case, the wedge has an inverted U shape. It is thus the lower ends of these sides which comprise toothing or notches and at least the side edges of the free end 2 which comprise complementary toothing or notches.

As in the preceding case, in a stage for tightening the clip, the wedge 61 is able to slide inside the casing 60 at least until the time of disengagement of the teeth of the wedge and of the free end. This sliding and this disengagement, as well as the sliding of the free end 2 relative to the end 3 of the band, at the time of tightening, are also facilitated by the orientation given to the faces 65 of the teeth 63 and corresponding faces of the teeth of the wedge 61.

Preferably, the travel of the wedge 61 inside the casing 60 in the unwedging direction is limited. This travel corresponds substantially to disengagement of the teeth of the wedge with respect to the teeth of the free end of the band. It thus corresponds to a vertical movement of the wedge substantially equal to the height of the teeth.

The limited travel of the wedge makes it possible to limit the slackening of the clip to a minimum at the time of tightening and to reduce to a minimum the distance which it must travel in order to effectively press the free end 2 against the end 3.

Any appropriate means will be suitable for limiting the travel of the wedge and for example punching provided in at least one of the side walls of the casing 60 and which has been shown diagrammatically at 67, or bending of at least one of the side walls or of the upper wall of the casing 60, in order to trap the wedge 61.

By way of example, good results have been obtained with a casing whereof the inclination of the upper face is approximately 40° with respect to the horizontal, with a pitch of 1 mm for the toothing of the free end 2, a tooth depth of 0.4 mm and by limiting the travel of the wedge to approximately 0.5 mm, for a hose-clip of 50 mm diameter approximately. These figures are given solely by way of example and are not intended to limit the invention.

When tightening the clip, the locking means act on the one hand by wedging of the wedge 61 between the upper wall of the casing 60 and the upper side of the free end 2 and on the other hand by engagement of the two sets of teeth on the wedge and on the free end.

It is necessary to note that the teeth are particularly advantageous to the extent that they prevent any loosening of the clip by an operator. In fact, the travel of the wedge in the casing is determined in order to facilitate disengagement of the teeth at the time of tightening. At the time of this tightening, the wedge is positioned automatically in order to allow sliding of the free end 2. On the other hand, for loosening, owing to the limitation of the travel of the wedge, in practice it will not be possible for an operator to completely disengage the teeth from each other. Thus, any dismantling of the present clip is destructive and only new clips may be tightened.

In order to improve the quality of the tightening operation and its uniformity on the periphery of the clip, the invention prefers to provide the end 3 with an impression 68, obtained for example by stamping. This impression is directed towards the end 2 of the band and ensures contact between the end 2 and the end 3 in the vicinity of the locking means and thus increases the pressure of the end 3 on the member held by the clip. This is also true of the afore-described locking means.

The traction means which facilitate tightening of the clip described with respect to FIG. 9 may be similar to the traction means which have already been described. However, in FIGS. 10 and 11, variations of these traction means are illustrated.

These means consist of a deformation 69, for example obtained by stamping, in the vicinity of the terminal part of the free end 2. This deformation 69 is in the form of a cup and is defined by various parameters, i.e. its length, its width and its depth.

Figure 10:
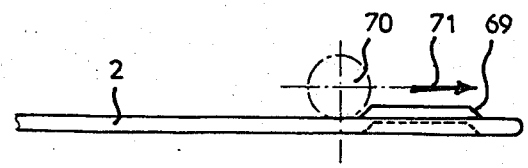
Figure 11:
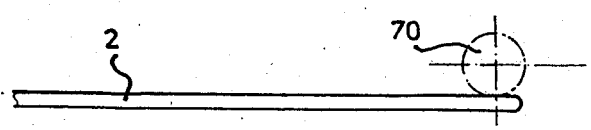

As shown in FIG. 10, the deformation 69 constitutes a holder and an abutment for a tightening tool which would grip the free end 2 and comprise a spindle designated by the reference numeral 70.

Traction exerted on the spindle 70, in the direction of arrow 71, causes pressing of this spindle on the deformation 69. This traction is also accompanied by tightening of the clip.

Beyond a predetermined pulling force, the spindle 70 "rolls" the free end 2 and obliterates the deformation 69. This is shown diagrammatically in FIG. 11 where the spindle 70 is illustrated on the other side of the deformation 69, which is no longer present.

This predetermined pulling force corresponds to a desired tension of the band constituting the clip and a desired tightening intensity of the clip.

It should be noted that after the obliteration of the deformation 69, it is no longer possible to achieve tightening, in view of the fact that the spindle 70 is no longer retained on the free end 2. Tightening is thus destructive, which contributes to the desired greater reliability of the invention.

Moreover, the predetermined pulling force beyond which the impression 69 is obliterated may be defined by the parameters of the deformation, which thus provides a variable resistance to the spindle 70. It may also be defined by the diameter of the spindle 70.

Thus, with the tightening means which have been proposed, the predetermined pulling force, which corresponds to the desired tension of the clip depends for the most part on parameters defining the deformation 69 and thus the clip itself. The tightening of a clip to a predetermined tension thus consequently no longer necessitates adjustment or calibration of a tightening tool or predetermined pulling force.

In fact, in order to obtain various predetermined pulling forces, it is sufficient to provide in the terminal parts of the free ends 2 deformations 69 of predetermined varying length, width and/or depth.

However, it should be noted that the predetermined pulling force beyond which the deformation 69 is obliterated also depends on the nature and more particularly on the malleability of the material used to produce the clip. This property is also important.

As a non-limiting example, the predetermined pulling force reached 500 kgf approximately for a deformation 69 having an approximate length of 10 mm, a width of 2 mm and a depth of 1 mm for a metal sheet having a thickness of 0.6 mm.

A man skilled in the art is able to determine the relationship between the parameters of the deformation 69, possibly of the spindle 70 and of the corresponding tightening tension of the clip.

As in the preceding case, it should be noted that the obliteration of the deformation 69 constitutes a visual control of tightening of the clip to a predetermined pulling force.

Naturally, the present description is given solely by way of example and other embodiments of the invention could be adopted without diverging from the scope of the latter.

In particular, the present invention could apply to clips made from materials other than metal and for example clips of plastics material.

What is claimed is:

1. A non-reusable hose clamp comprising a metal band forming a loop and having first and second end portions, a casing in the form of an inverted U with a rectangular wall portion intermediate two trapezoidal side portions secured at their free edges to opposite side edges of said first end portion of said band with said wall portion disposed at an acute angle to the band, a wedge fitting in said casing, said wedge being of U-shaped cross section with a rectangular wall portion intermediate two triangular side portions, the angle of said side portions of said wedge being substantially the same as that of said side portions of said casing, and a spring attached to and connecting said wedge and said casing and urging said wedge inwardly in said casing, said second end portion of said band passing between said wedge and said first end portion of the band and being clamped by said wedge against said first end portion of said band.

2. A non-reusable hose clamp according to claim 1, in which said casing, wedge, and spring are formed integrally of a single piece of sheet metal, said casing and wedge being formed by two trapezoidal portions of said sheet metal connected by a narrow portion forming said spring.

3. A non-reusable hose clamp according to claim 1, in which free edges of said side portions of said casing are bent inwardly under opposite edges of said first end portion of said band.

4. A non-reusable hose clamp according to claim 3, in which said first end portion of the band passes through the casing and is bent inwardly at opposite ends of said casing so that portions of said band at opposite ends of the casing lie in approximately the same plane as said inturned edges of said side portions of said casing.

5. A non-reusable hose clamp according to claim 1, in which said wall portion of said wedge is in sliding interengagement with the inner surface of said wall portion of said casing and free edges of said side portions of said wedge engage said second end portion of said band.

6. A non-reusable hose clamp according to claim 5, in which said free edges of said side portions of said wedge are toothed.

7. A non-reusable hose clamp according to claim 1, in which the outer surface of the second end portion of the band and the inner portion of said wedge have interengaging teeth.

8. A non-reusable hose clamp according to claim 7, comprising means for limiting the movement of said wedge into said casing to a position corresponding substantially to the disengagement of the teeth on the wedge with the teeth on the band.

9. A non-reusable hose clamp according to claim 1, in which said second end portion of said band is provided with a pre-shaped end for engagement by a tool for pulling said second end portion to tighten said band, said pre-shaped end being adapted to be deformed by said tool upon application of a predetermined pulling force to release said tool and inhibit reuse of said clamp.

10. A non-reusable hose clamp according to claim 9, in which said pre-shaped end comprises a bent flange at the end of said second end portion of the band and a hole spaced inwardly of said flange, said flanged end being adapted to be bent by said tool upon application of a predetermined force to release said tool from the band and inhibit reuse of the clamp.

11. A non-reusable hose clamp according to claim 9, in which said pre-shaped end comprises a cup-shaped deformation in the band, said deformation being flattened by said tool upon application of predetermined force to release said tool from the band and inhibit reuse of the clamp.

* * * * *